US011178393B1

(12) United States Patent
Baron

(10) Patent No.: US 11,178,393 B1
(45) Date of Patent: *Nov. 16, 2021

(54) CAMERA HOLDER FOR ECONOMICAL AND SIMPLIFIED TEST ALIGNMENT

(71) Applicant: Snap Inc., Santa Monica, CA (US)

(72) Inventor: Alan E. Baron, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,305

(22) Filed: Jul. 27, 2020

Related U.S. Application Data

(63) Continuation of application No. 16/391,162, filed on Apr. 22, 2019, now Pat. No. 10,764,571.

(51) Int. Cl.
*H04N 17/00* (2006.01)
*G02B 7/02* (2021.01)
*H04N 5/225* (2006.01)
*G02B 27/01* (2006.01)

(52) U.S. Cl.
CPC ........... *H04N 17/002* (2013.01); *G02B 7/023* (2013.01); *G02B 27/0172* (2013.01); *H04N 5/2257* (2013.01); *G02B 2027/0138* (2013.01)

(58) Field of Classification Search
CPC .... H04N 17/002; H04N 5/2257; G06B 7/023; G02B 27/0172; G06F 3/1446; G09G 2300/026
USPC ....... 348/187, 188, 95; 345/8, 633; 359/578; 356/399
See application file for complete search history.

(56) References Cited

U.S. PATENT DOCUMENTS

| | | | |
|---|---|---|---|
| 4,009,940 A | 3/1977 | Ohzu | |
| 6,091,546 A | 7/2000 | Spitzer | |
| 9,952,452 B1 | 4/2018 | Hanover et al. | |
| 10,764,571 B1 | 9/2020 | Baron | |
| 2007/0183773 A1* | 8/2007 | Aoki | H04N 5/2253 396/529 |
| 2007/0285663 A1 | 12/2007 | Hewitt et al. | |
| 2010/0020180 A1 | 1/2010 | Hill et al. | |
| 2013/0278631 A1 | 10/2013 | Border et al. | |
| 2014/0055746 A1 | 2/2014 | Nistico et al. | |
| 2016/0041624 A1 | 2/2016 | Spiessl et al. | |

(Continued)

FOREIGN PATENT DOCUMENTS

| | | |
|---|---|---|
| CN | 104280219 A | 1/2015 |
| CN | 207964249 U | 10/2018 |

OTHER PUBLICATIONS

International Search Report and Written Opinion for International Application No. PCT/US2019/065881, dated Apr. 9, 2020 (Apr. 9, 2020)—11 pages.

*Primary Examiner* — John W Miller
*Assistant Examiner* — Sean N. Haiem
(74) *Attorney, Agent, or Firm* — Culhane Meadows PLLC; Stephen J. Weed

(57) ABSTRACT

A test fixture for holding and testing portions of an optical device, such as a plurality of cameras of an eyewear device. The test fixture includes a relay lens such that the fixture can be positioned close to a test screen displaying a patterned test image and reducing the size and cost of parts. The test fixture includes one or more lasers configured to easily and quickly align the test fixture. The test fixture includes an actuator for selectively positioning the cameras behind the relay lens to check for image quality.

20 Claims, 19 Drawing Sheets

(56) References Cited

U.S. PATENT DOCUMENTS

| | | | |
|---|---|---|---|
| 2016/0142605 A1* | 5/2016 | Shimizu | G02B 7/021 |
| | | | 348/373 |
| 2016/0191911 A1 | 6/2016 | Filhaber et al. | |
| 2016/0292850 A1 | 10/2016 | Perez et al. | |
| 2016/0373734 A1* | 12/2016 | Cole | H04N 17/002 |
| 2017/0155830 A1 | 6/2017 | Chien et al. | |
| 2017/0188813 A1 | 7/2017 | Arnold et al. | |
| 2017/0248799 A1 | 8/2017 | Streets et al. | |
| 2017/0249833 A1 | 8/2017 | Shroat | |
| 2018/0035531 A1 | 2/2018 | Nalla et al. | |
| 2018/0120198 A1 | 5/2018 | Glasenapp et al. | |
| 2018/0333208 A1 | 11/2018 | Kotian et al. | |
| 2018/0350056 A1 | 12/2018 | Cardenas | |
| 2021/0048563 A1* | 2/2021 | Kim | G02B 7/04 |

* cited by examiner

CAMERA HOLDER FOR ECONOMICAL AND SIMPLIFIED TEST ALIGNMENT

CROSS-REFERENCE TO RELATED APPLICATIONS

This application is a continuation of U.S. application Ser. No. 16/391,162, filed Apr. 22, 2019, which is incorporated herein by reference in its entirety.

TECHNICAL FIELD

The present disclosure generally relates to a test fixture for testing multiple camera elements on a device

BACKGROUND

Devices, such as eyewear, sometimes have multiple optical portions, such as cameras, that need to be tested for quality. Test fixtures are used to align the optical portions with test patterns.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1A:
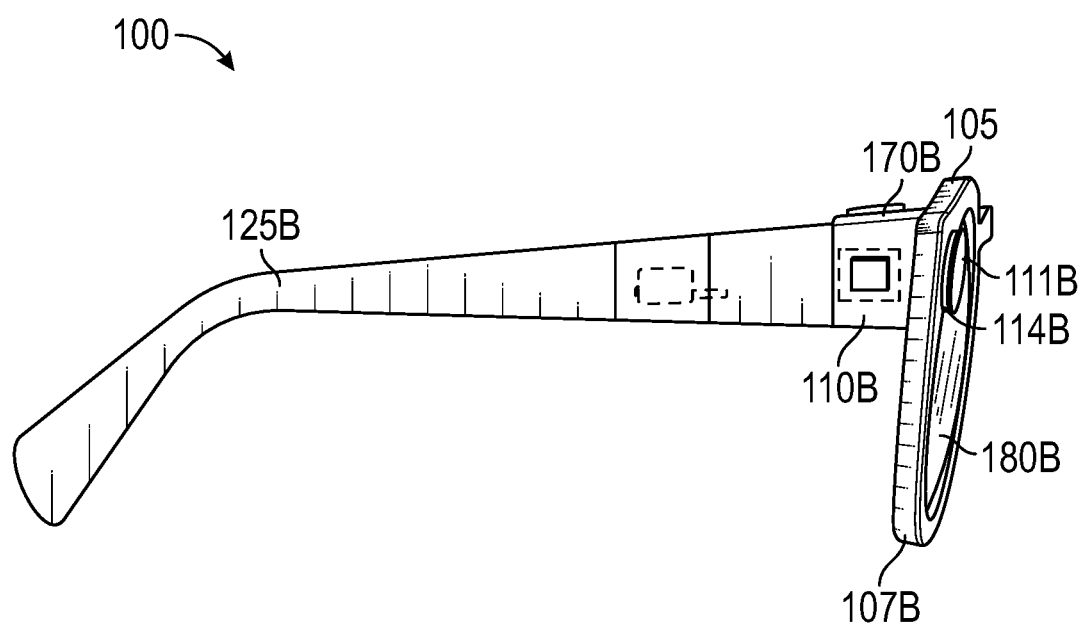
FIG. 1A is a side view of an example hardware configuration of an eyewear device, which shows a right optical assembly with an image display, and field of view adjustments are applied to a user interface presented on the image display based on detected head or eye movement by a user.

When a consumer device with multiple cameras is manufactured, the cameras are assembled into the consumer device, and then the cameras are individually tested for image quality and alignment. For example, eyewear is secured to a test fixture, and a left side camera of eyewear is placed in front of an image quality target such as a test screen displaying test pattern. An image is taken by the first camera and analyzed. If the image quality meets a test threshold, the first camera "passes" the test. If the first camera fails the test, the consumer device is rejected for scrap or rework. The process is repeated for a right side camera. If both tests of the cameras pass, the consumer device passes.

Test fixtures for holding two camera eyewear devices are difficult to align and keep accurately aligned in a factory. The test fixtures are subject to misalignment over time, are expensive, and time consuming sometimes requiring several hours to align. Test fixtures typically need to provide alignment on 6 axes: x, y, z, pitch(elevation), yaw(azimuth), and roll.

One aspect of this disclosure describes a test fixture that is configured to align two or more cameras on an eyewear device to a test pattern. The test fixture is relatively easy to align, is easy to use, and improves the rate at which the eyewear cameras on the eyewear can be tested at the factory.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1A is a side view of an example hardware configuration of an eyewear device 100, which includes a right optical assembly 180B with an image display, that provides visual area adjustments to a user interface presented on the image display based on detected head or eye movement by a user. Eyewear device 100 includes multiple visible light cameras 114A-B that form a stereo camera, of which the right visible light camera 114B is located on a right chunk 110B. The cameras 114A-B can also comprise of augmented reality (AR) sensors and other optical devices that need a quality check and test of alignment.

The left and right visible light cameras 114A-B are sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generate images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor for digital processing along with a timestamp in which the image of the scene is captured. The image processor includes circuitry to receive signals from the visible light camera 114A-B and process those signals from the visible light camera 114 into a format suitable for storage in the memory. The timestamp can be added by the image processor or other processor, which controls operation of the visible light cameras 114A-B. Visible light cameras 114A-B allow the stereo camera to simulate human binocular vision. Stereo camera provides the ability to reproduce three-dimensional images based on two captured images from the visible light cameras 114A-B having the same timestamp. Such three-dimensional images allow for an immersive life-like experience, e.g., for virtual reality or video gaming. For stereoscopic vision, a pair of images is generated at a given moment in time—one image for each of the left and right visible light cameras 114A-B. When the pair of generated images from the frontward facing angles of coverage 111A-B of the left and right visible light cameras 114A-B are stitched together (e.g., by the image processor), depth perception is provided by the optical assembly 180A-B.

In an example, a user interface field of view adjustment system includes the eyewear device 100. The eyewear device 100 includes a frame 105, a right temple 110B extending from a right lateral side 170B of the frame 105, and a see-through image display 180D (FIGS. 2A-B) comprising optical assembly 180B to present a graphical user interface to a user. The eyewear device 100 includes a left visible light camera 114A connected to the frame 105 or the left temple 110A to capture a first image of the scene. Eyewear device 100 further includes a right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes a processor coupled to the eyewear device 100 and connected to the visible light cameras 114A-B, a memory accessible to the processor, and programming in the memory, for example in the eyewear device 100 itself or another part of the user interface field of view adjustment system.

Figure 2A:
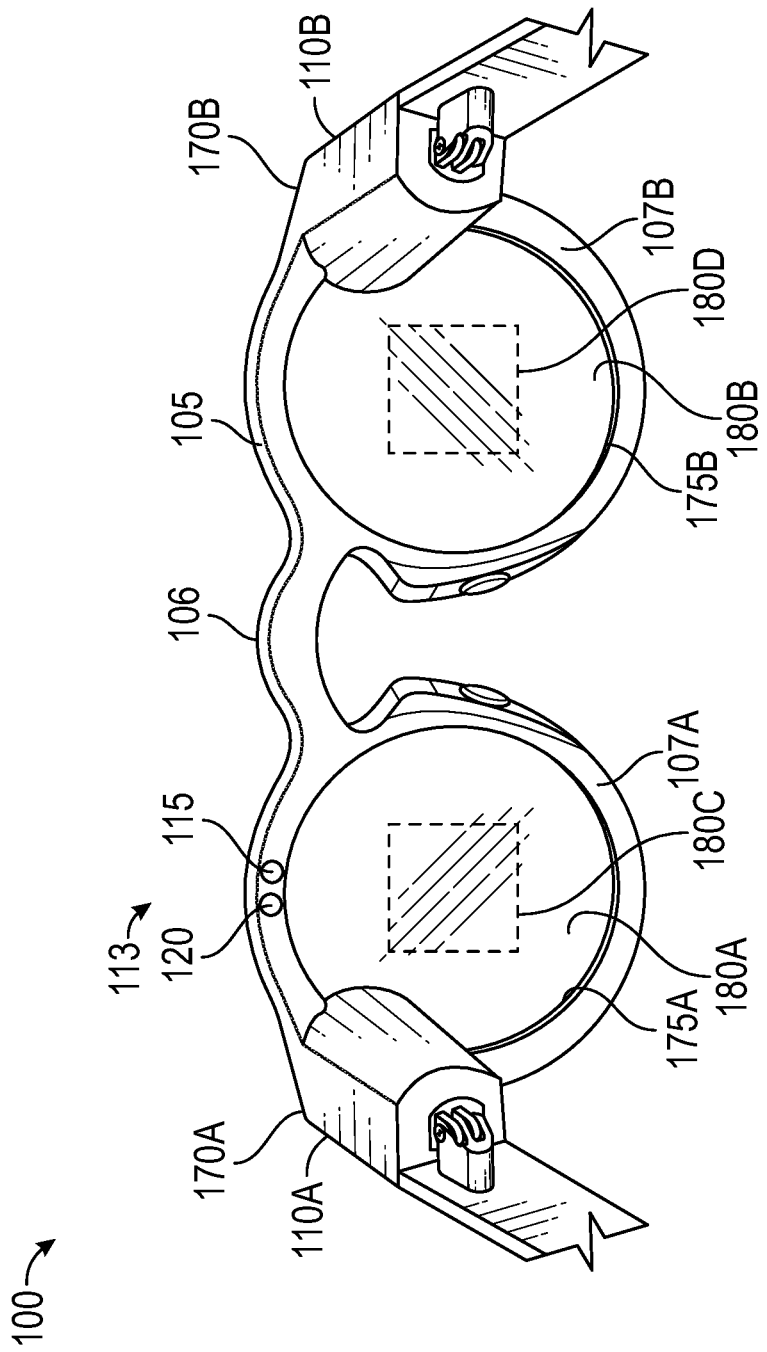
FIG. 2A is a rear view of an example hardware configuration of an eyewear device, which includes an eye scanner on a frame, for use in a system for identifying a user of the eyewear device.
Figure 2B:
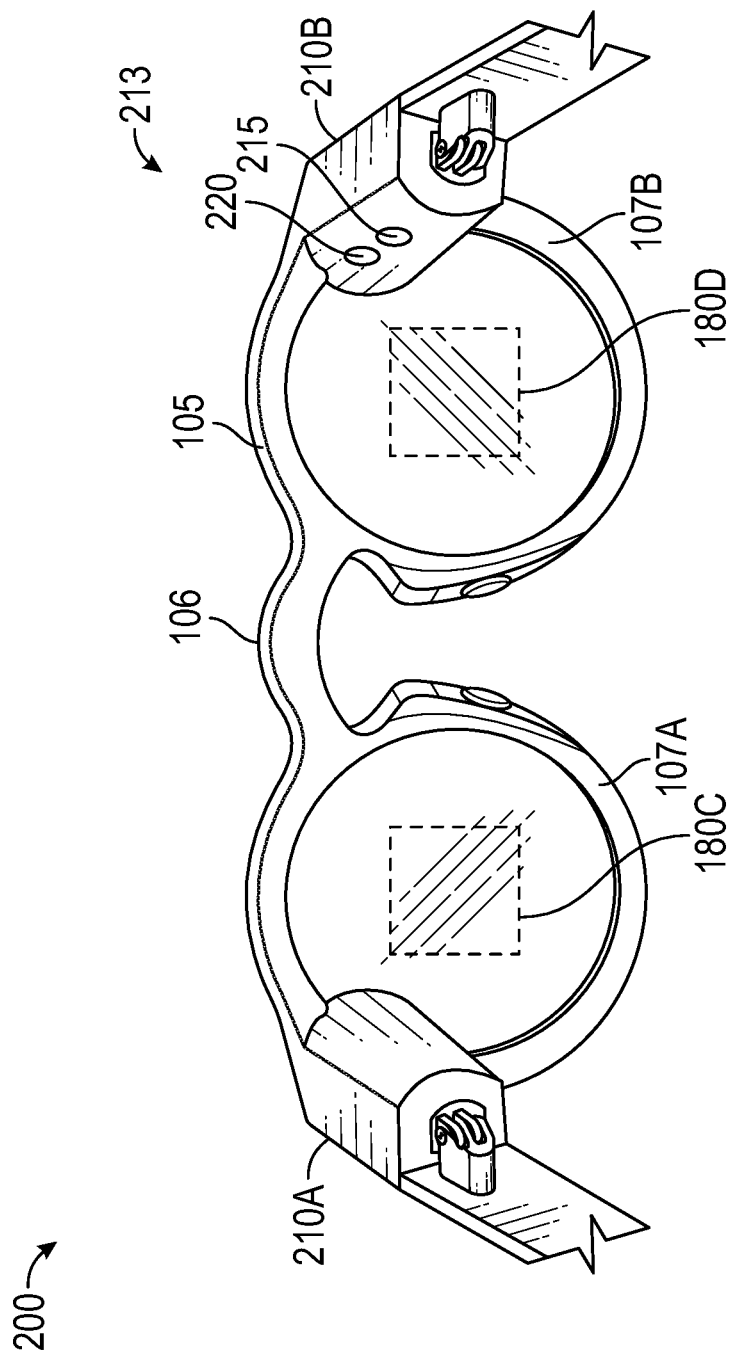
FIG. 2B is a rear view of an example hardware configuration of another eyewear device, which includes an eye scanner on a chunk, for use in a system for identifying a user of the eyewear device.

Although not shown in FIG. 1A, the eyewear device 100 also includes a head movement tracker or an eye movement tracker (element 213 of FIGS. 2A-B). Eyewear device 100 further includes the see-through image displays 180C-D of optical assembly 180A-B for presenting a sequence of displayed images, and an image display driver coupled to the see-through image displays 180C-D of optical assembly 180A-B to control the image displays 180C-D of optical assembly 180A-B to present the sequence of displayed images, which are described in further detail below. Eyewear device 100 further includes the memory and the processor having access to the image display driver and the memory. Eyewear device 100 further includes programming in the memory. Execution of the programming by the processor configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction.

Execution of the programming by the processor further configures the eyewear device 100 to detect movement of a user of the eyewear device by: (i) tracking, via the head movement tracker, a head movement of a head of the user, or (ii) tracking, via the eye movement tracker (element 213 of FIGS. 2A-B), an eye movement of an eye of the user of the eyewear device 100. Execution of the programming by the processor further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor further configures the eyewear device 100 to generate a successive displayed image of the sequence of displayed images based on the field of view adjustment. Execution of the programming by the processor further configures the eyewear device 100 to present, via the see-through image displays 180C-D of the optical assembly 180A-B, the successive displayed image.

Figure 1B:
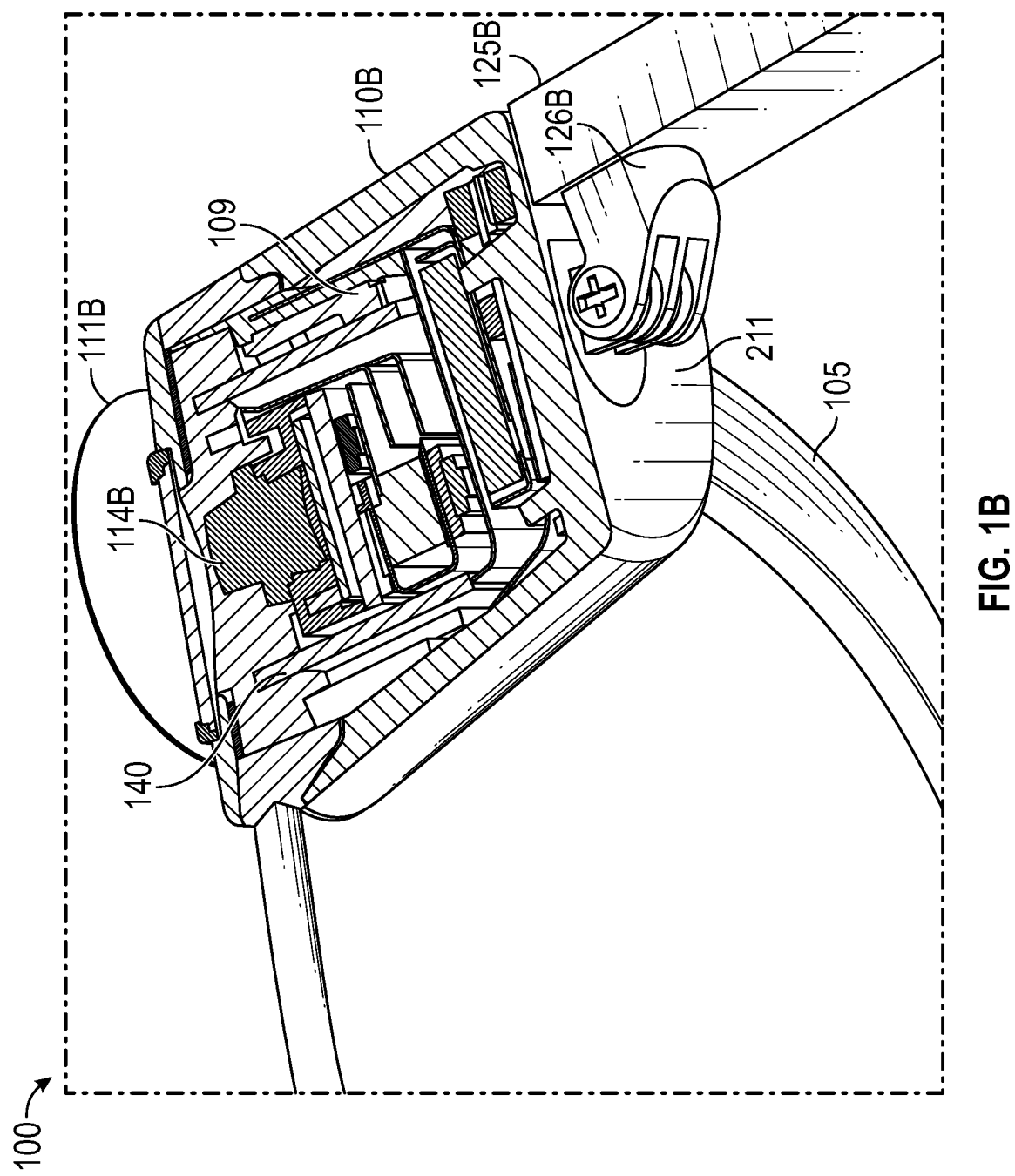
FIG. 1B is a top cross-sectional view of a chunk of the eyewear device of FIG. 1A depicting a visible light camera, a head movement tracker for tracking the head movement of the user of the eyewear device, and a circuit board.

FIG. 1B is a top cross-sectional view of the chunk of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 126B connects the right chunk 110B to a right temple 125B of the eyewear device 100. In some examples, components of the right visible light camera 114B, the flexible PCB 140, or other electrical connectors or contacts may be located on the right temple 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for forward-back movement (Z). The gyroscope detects the gravity vector. The magnetometer defines the rotation in the magnetic field (e.g., facing south, north, etc.) like a compass which generates a heading reference. The three accelerometers detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 240 and covered by a visible light camera cover lens, which is aimed through opening(s) formed in the right chunk 110B. In some examples, the frame 105 connected to the right chunk 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing angle of coverage 111B with a line of sight or perspective of the right eye of the user of the eyewear device 100. The visible light camera cover lens can also be adhered to an outwards facing surface of the right chunk 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left chunk 110A adjacent the left lateral side 170A of the frame 105 and the right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In the example of FIG. 2A, the eye scanner 113 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the left rim 107A. The frame 105 or one or more of the left and right chunks 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the chunks 110A-B, or vice versa. The infrared emitter 115 can be connected essentially anywhere on the frame 105, left chunk 110A, or right chunk 110B to emit a pattern of infrared light. Similarly, the infrared camera 120 can be connected essentially anywhere on the frame 105, left chunk 110A, or right chunk 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the chunks 110A-B at either ends of the frame 105.

FIG. 2B is a rear view of an example hardware configuration of another eyewear device 200. In this example configuration, the eyewear device 200 is depicted as including an eye scanner 213 on a right chunk 210B. As shown, an infrared emitter 215 and an infrared camera 220 are co-located on the right chunk 210B. It should be understood that the eye scanner 213 or one or more components of the eye scanner 213 can be located on the left chunk 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
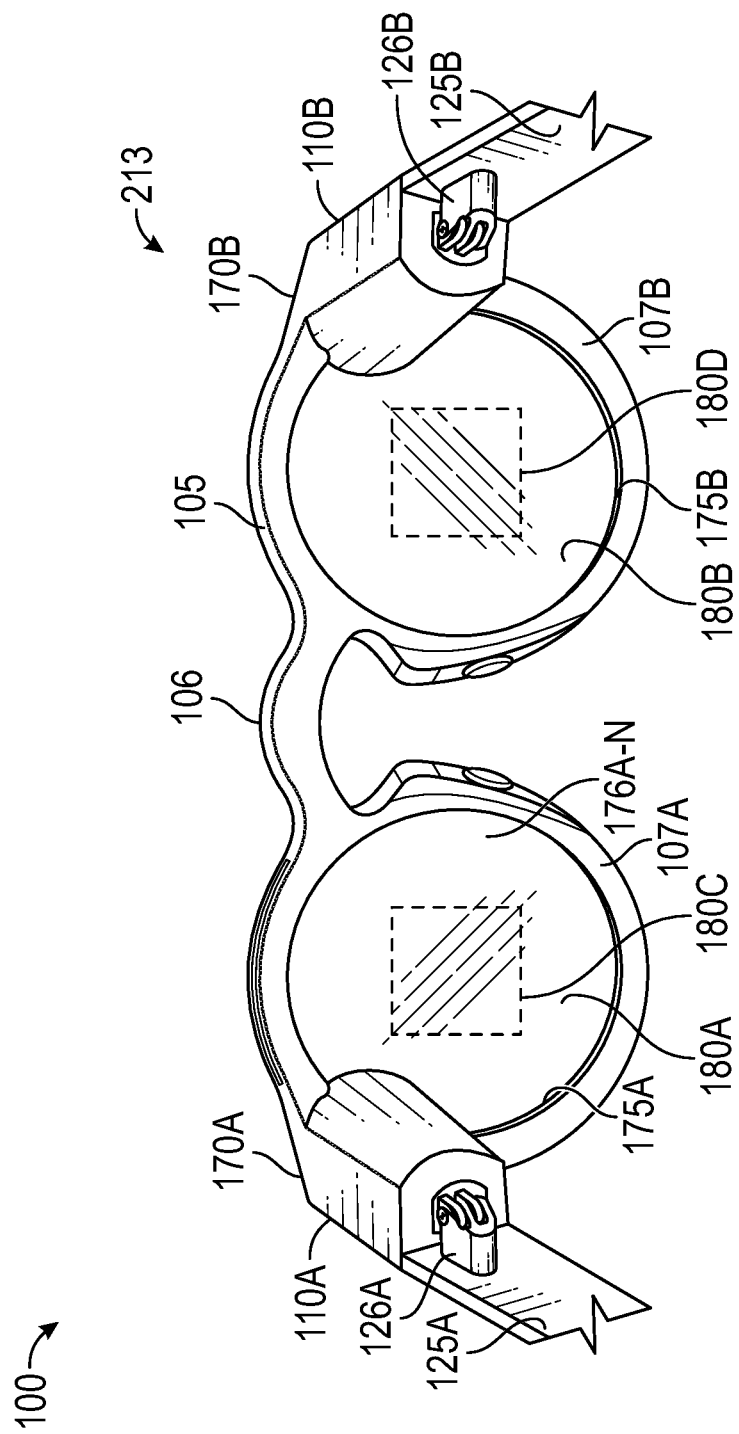
FIGS. 2C and 2D are rear views of example hardware configurations of the eyewear device, including two different types of image displays.
Figure 2D:
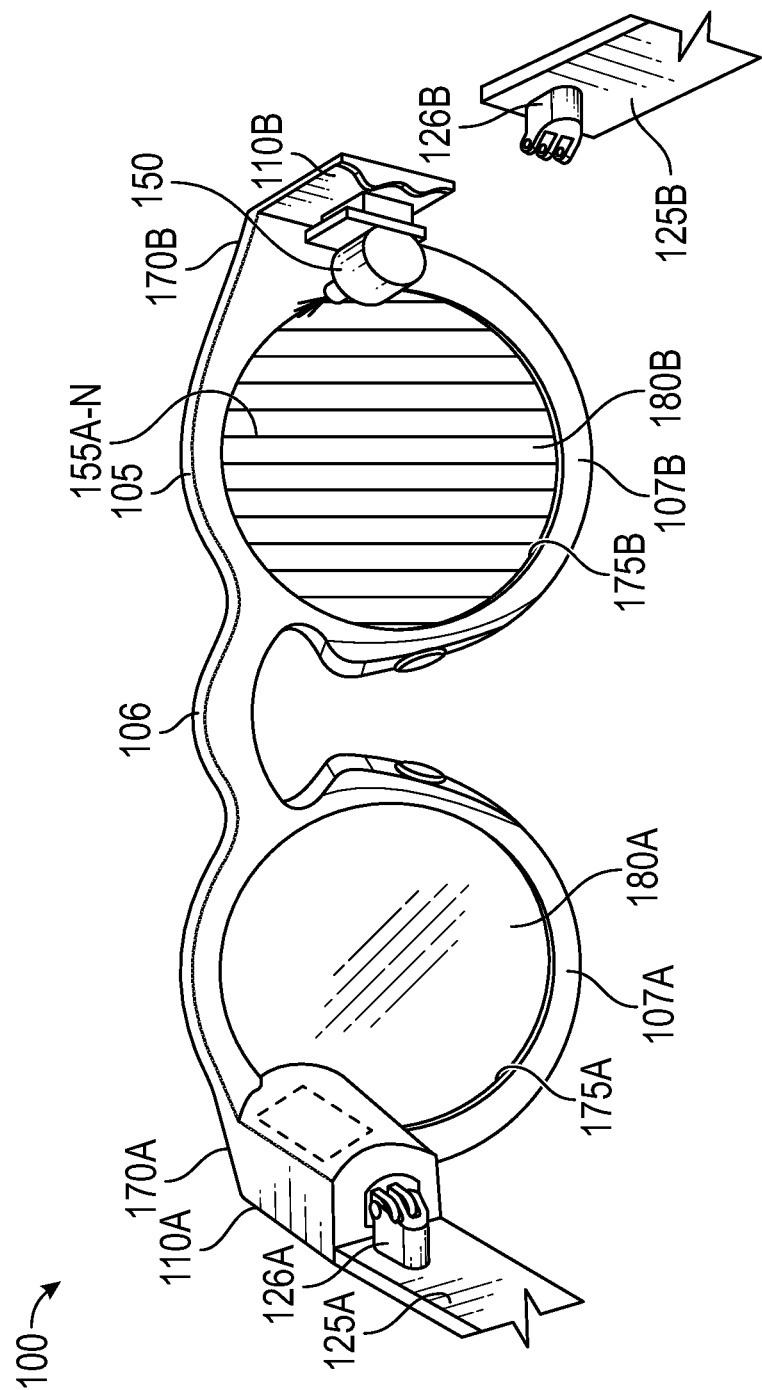

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B includes a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assembly 180A-B. The first optical assembly 180A includes the first see-through image display 180C (e.g., a display matrix of FIG. 2C or optical strips 155A-N' and a projector 150A). The second optical assembly 180B includes the second see-through image display 180D e.g., a display matrix of FIG. 2C or optical strips 155A-N'' and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting toward the edge. If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3A:
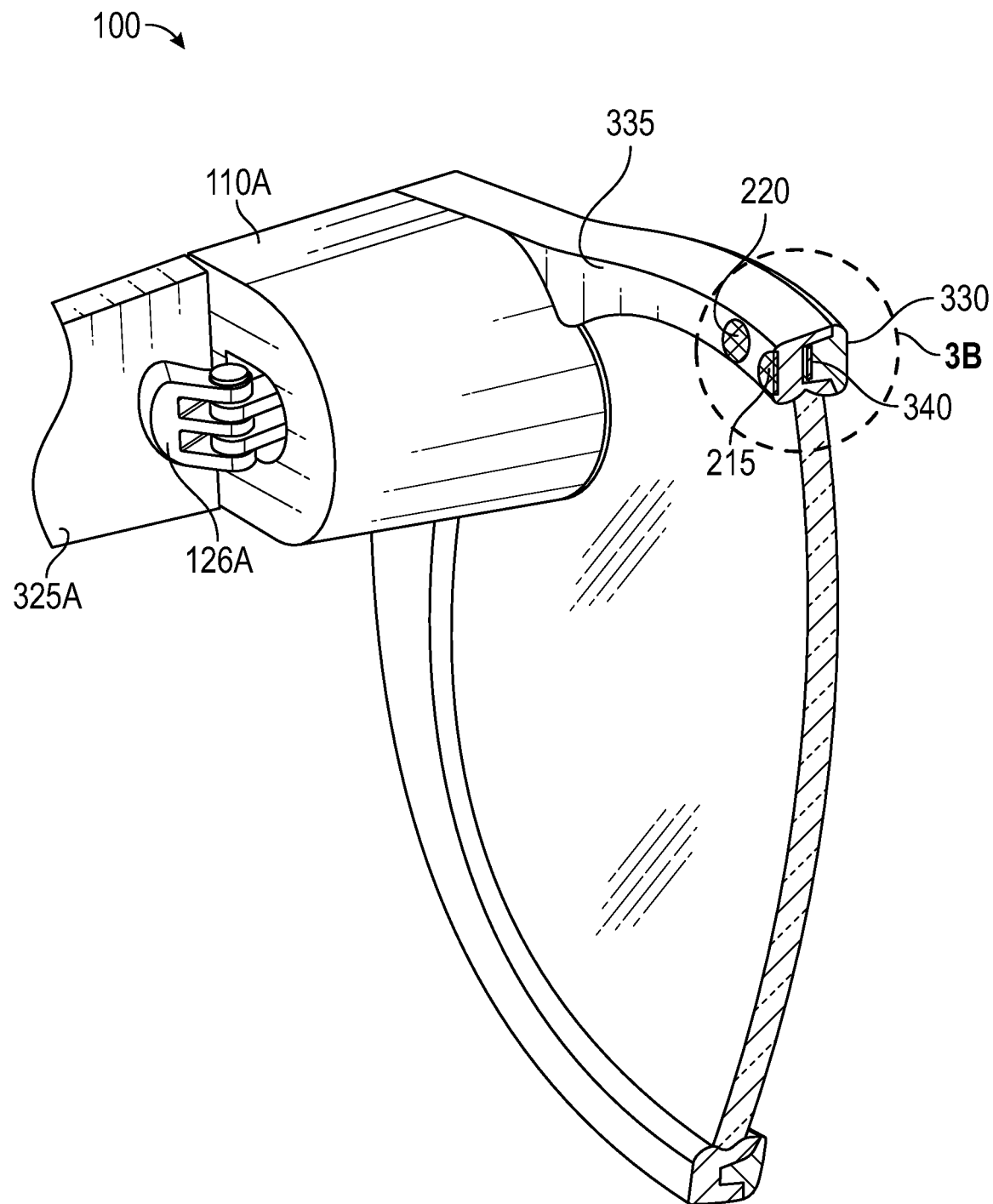
FIG. 3A shows a rear perspective view of the eyewear device of FIG. 2A depicting an infrared emitter, an infrared camera, a frame front, a frame back, and a circuit board.

FIG. 3A shows a rear perspective view of the eyewear device of FIG. 2A. The eyewear device 100 includes an infrared emitter 215, infrared camera 220, a frame front 330, a frame back 335, and a circuit board 340. It can be seen in FIG. 3A that the upper portion of the left rim of the frame of the eyewear device 100 includes the frame front 330 and the frame back 335. An opening for the infrared emitter 215 is formed on the frame back 335.

As shown in the encircled cross-section 3B in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 126A. In some examples, components of the eye movement tracker 213, including the infrared emitter 215, the flexible PCB 340, or other electrical connectors or contacts may be located on the left temple 325A or the left hinge 126A.

Figure 3B:
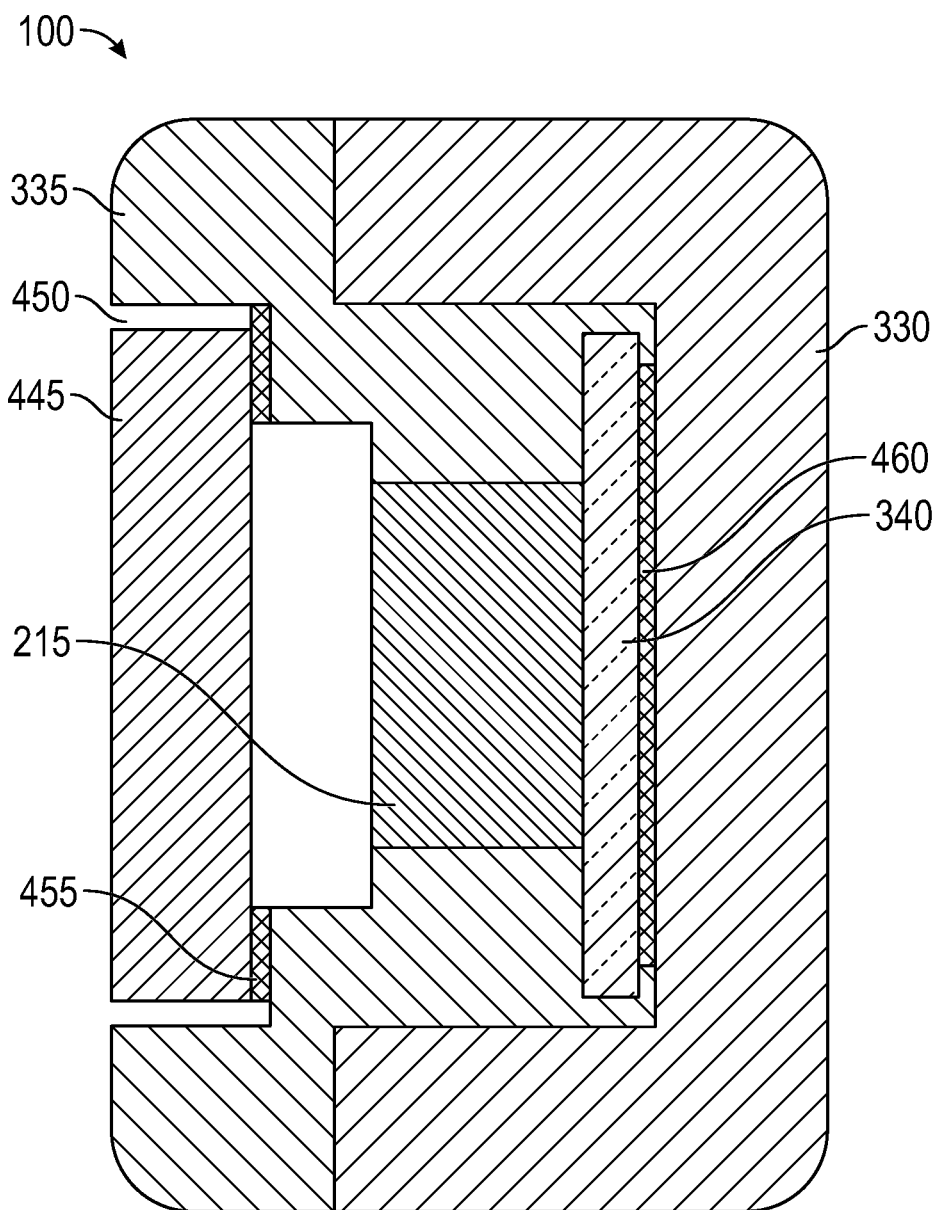
FIG. 3B is a cross-sectional view taken through the infrared emitter and the frame of the eyewear device of FIG. 3A.

FIG. 3B is a cross-sectional view through the infrared emitter 215 and the frame corresponding to the encircled cross-section 3B of the eyewear device of FIG. 3A. Multiple layers of the eyewear device 100 are illustrated in the cross-section of FIG. 3B, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 4:
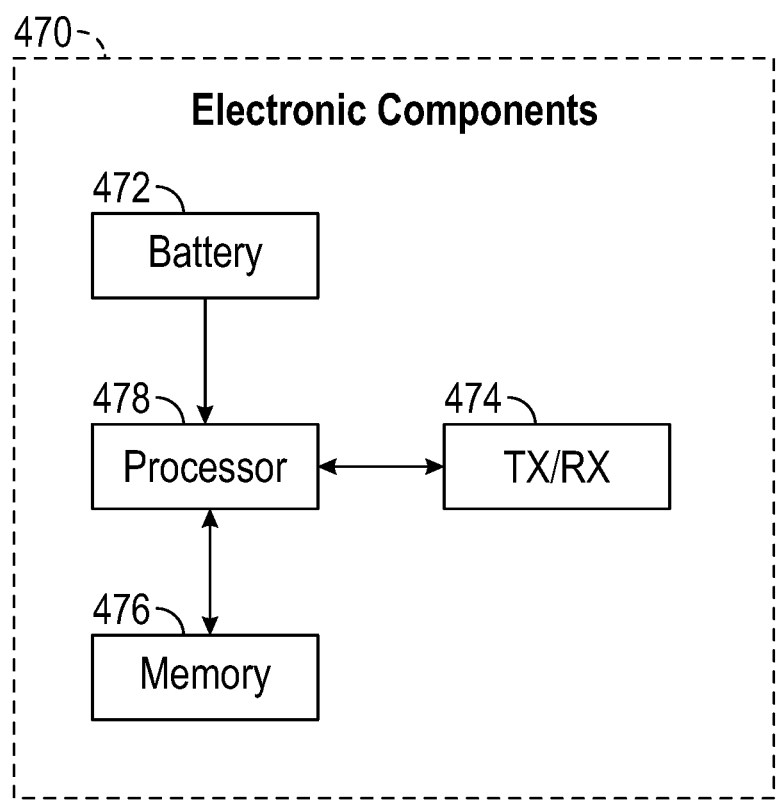
FIG. 4 is a block diagram depicting electronic components for use in the eyewear of FIG. 1A.

FIG. 4 depicts example electronic components 470 for use in eyewear device 100. The illustrated electronic components 470 include the battery 472, a wireless transceiver 474, a data storage device 476, and a processor 478. Wireless transceiver 474 enables communication between the eyewear device 100 and external devices, e.g., a mobile device, a Wi-Fi hotspot, or other communication device. Data storage device 476 may include static memory, dynamic memory, or a combination thereof. Data storage device 476 stores information received from processor 478 and includes instructions for execution by processor 478 to implement functionality of eyewear 100. Processor 478 receives power from battery 472 and executes instructions stored in data storage device 476 to perform functionality of eyewear 100 such as controlling operation of eyewear 100 and communicating with external devices via transceiver 474.

Details of the alignment fixture is provided below.

Figure 5A:
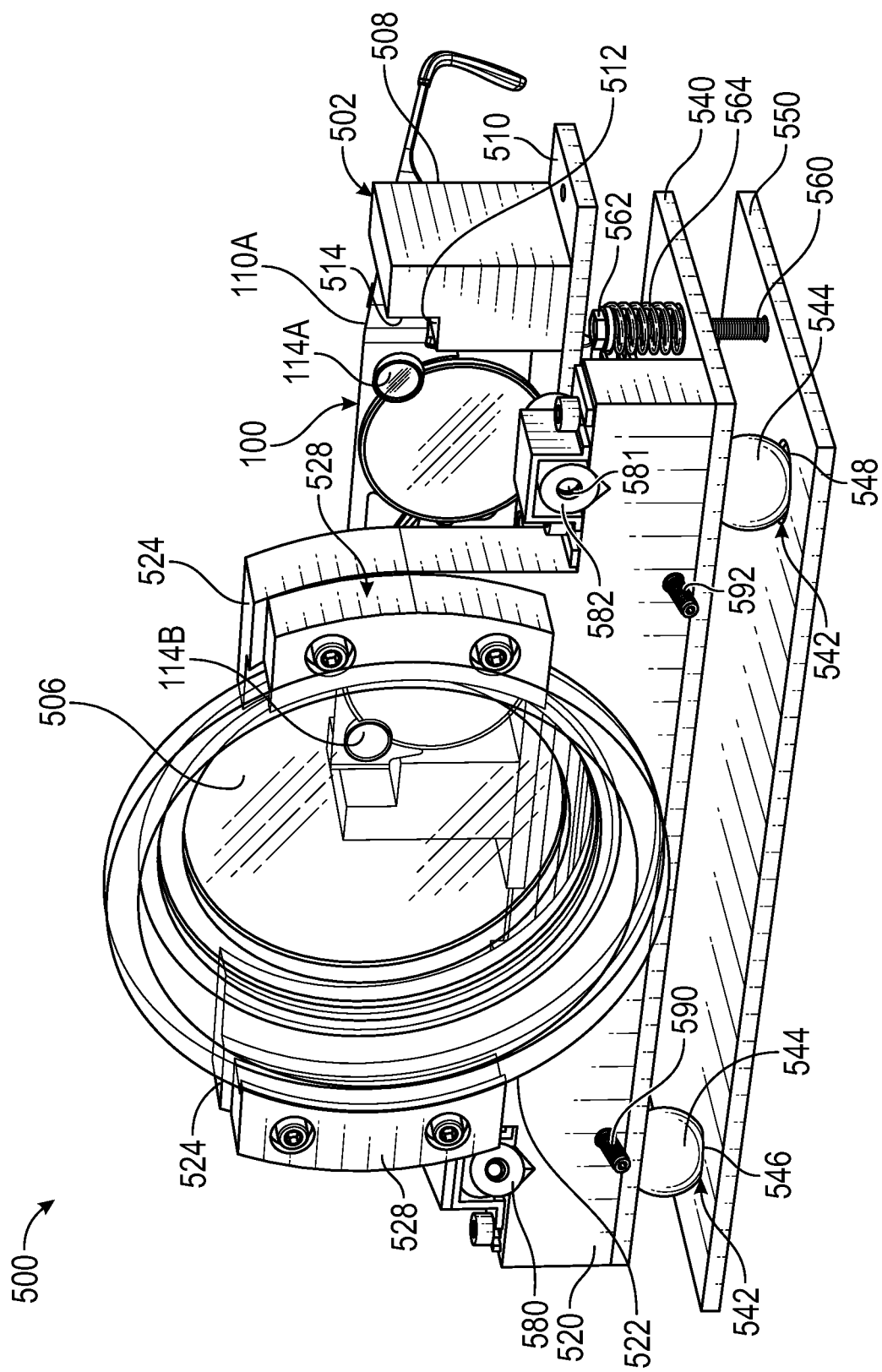
FIG. 5A, FIG. 5B, and FIG. 6 illustrates a test fixture including a camera holder for economical and simplified test alignment of eyewear, including optional precision adjustment screws used to align a sliding stage with internal components of the test fixture.
Figure 5B:
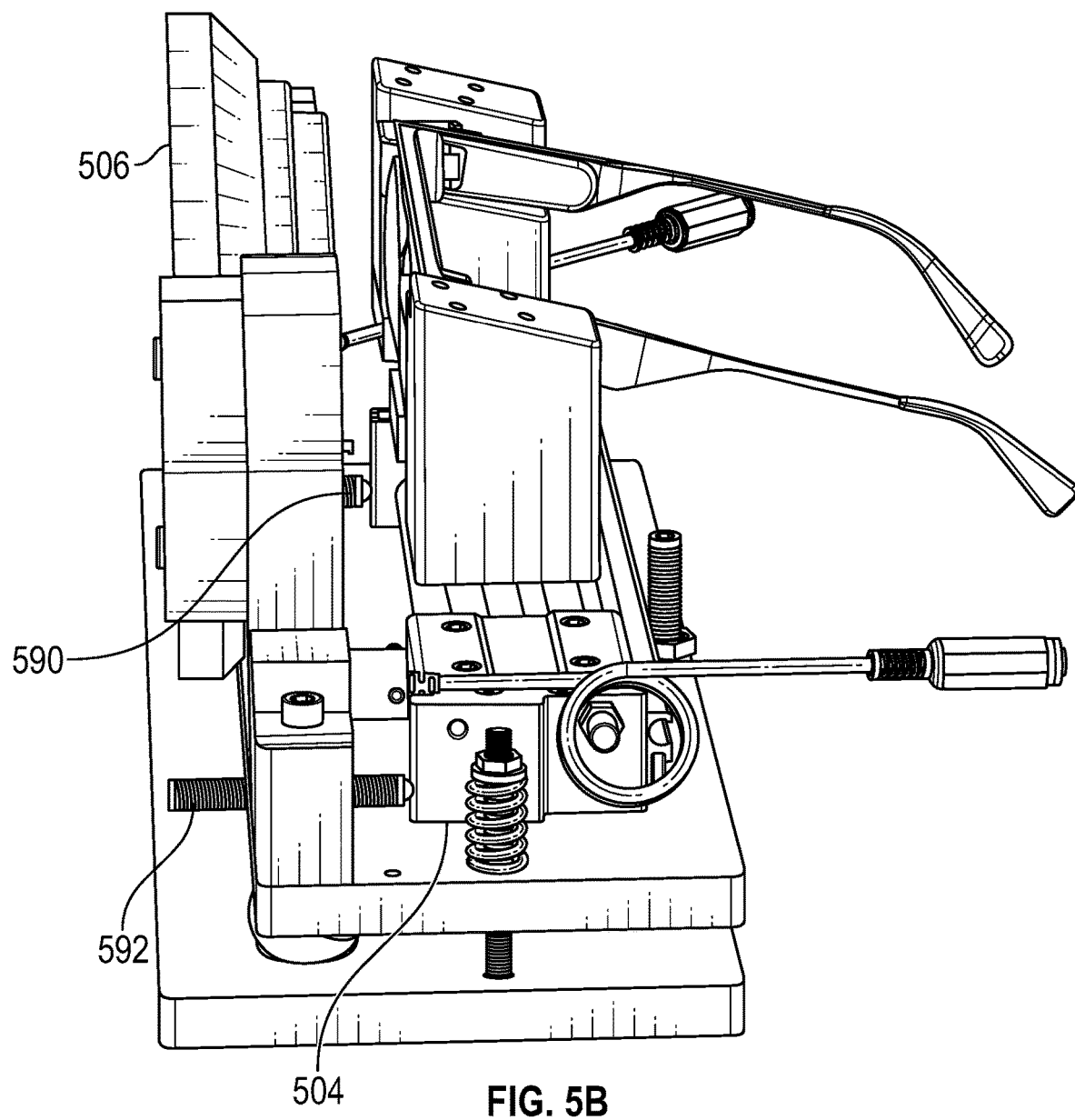
Figure 6:
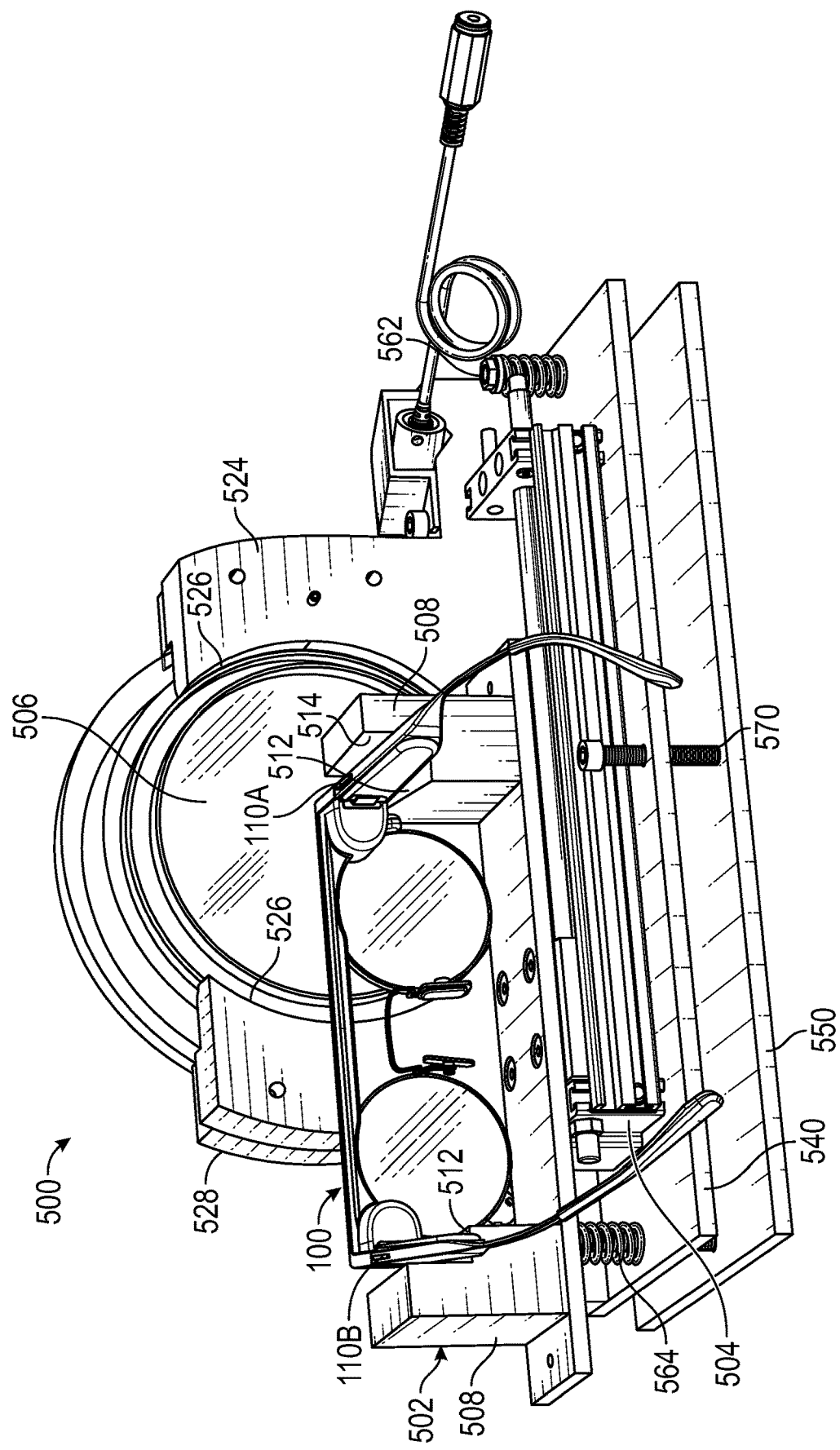

Referring now to FIG. 5A, 5B, and FIG. 6, there is shown a test fixture 500 including a camera holder for economical and simplified test alignment (CHEST) of eyewear 100 according to an example of this disclosure. CHEST 500 is a mechanical fixture for use in manufacturing of consumer electronic devices which have two (stereo) or more cameras. The manufacturing process for such devices involves assembly and test of cameras to verify that they have adequate image quality, and that the two cameras are aligned within desired limits. The test of two cameras within one device presents unique challenges for the test station and process. CHEST 500 greatly simplifies test instrumentation, improves accuracy, and reduces the cost of testing devices with dual cameras. CHEST 500 has a novel configuration comprising integral alignment lasers, relay lens, and 4 axis adjustment.

CHEST 500 is seen to include an eyewear holder generally shown at 502 configured to selectively hold and secure the eyewear 100 with the cameras 114A-B vertically oriented on each side of the eyewear 100. The eyewear holder 502 is secured upon a left/right slider 504 which is configured to selectively and precisely slide each of the cameras 114A-B behind a relay lens 506 for performing camera image quality and alignment tests. The relay lens 506 is mechanically aligned with the eyewear holder 502 using precision machine parts. The relay lens 506 is utilized because it allows the test eyewear 100 to be positioned much closer to a test screen (FIG. 7), allowing the use of physically smaller and less expensive test equipment and thus a smaller test station. For example, the relay lens 506 is positioned at a z distance of 0.35 meters, as opposed to 1.0 meter if the relay lens 506 is omitted. In one example, the dimensions of the test screen are 0.7 meters×0.7 meters when using the relay lens 506, and as large as 2.5 meters×2.5 meters without using the relay lens 506. When using the relay lens 506, each camera 114A-B must be centered behind the relay lens 506, and the relay lens 506 must be aligned (centered and perpendicular) to the test screen.

The eyewear holder 502 includes two spaced apart and opposing eyewear holder platforms 508 secured upon a laterally extending planar base 510. The platforms 508 are configured generally as blocks with each having an inner horizontal ledge 512, and an outer vertical retaining wall 514 configured to securely hold a respective end of the eyewear 100 on the left/right slider 504. As shown, the temples 110A-B rest upon the respective angled ledges 512, which temples 110A-B are sandwiched and secured between the vertical retaining walls 514 such that each of the cameras 114A-B face forward and toward relay lens 506.

The slider 504 includes a pneumatic actuator positioned under the planar base 510. The pneumatic actuator is controllable by a user of the CHEST 500 to selectively set a position of the left/right slider 504. In an example, the pneumatic actuator selectively positions left camera 114A behind the relay lens 506 for alignment, and also selectively positions the right camera 114B behind the relay lens 506 for alignment.

The relay lens 506 is secured in a vertical position such that a focal point of the relay lens 506 is horizontally forward of the relay lens 506. A lens support 520 has an upwardly facing concave surface 522 supporting a lower rim portion of the circular and convex relay lens 506 at a midsection of the lens support 520. The lens support 520 also has a pair of vertically extending and opposing side support arms 524 with respective concave surfaces 526 for securing the relay lens 506 in place upon the lens support 520. A clamp 528 is secured to each side support arm 524 by a respective fastener 530 to clamp and secure the relay lens 506. The lens support 520 is secured upon and along a forward portion of an upper plate 540.

The upper plate 540 is securely spaced over, and separated from, a lower plate 550. A pair of pitch adjustment kinematic pivot points generally shown at 542 space the upper plate 540 from a lower plate 550. In an example, the pivot points 542 each comprise a ball 544. The lower plate 550 has a spherical recess 546 on the left side of the lower plate 550, and an elliptical or oval recess 548 on the right side, wherein each recess 546 and 548 receives a respective ball 544. The spherical recess 546 positions the upper plate 540 in place, and the elliptical or oval recess 548 allows the respective ball 544 to slightly move laterally as the upper plate 540 is moved and aligned in position. A pair of tension screws 560 are seen to extend through each end of the upper plate 540, one at each end of upper plate 540, and are affixed to the lower plate 550 using the head of the screw in a slot to allow for movement when screw 570 is adjusted. A screw head 562 adjustably compresses a respective tension spring 564 positioned between the screw head 562 and an upper surface of upper plate 540 to set and hold the upper plate 540 and the lower plate 550 together. A pitch adjustment lead screw 570 extends through a middle portion of the upper plate 540 and is attached to the lower plate 550. Turning the lead screw 570 clockwise or counterclockwise selectively establishes the pitch of the upper plate 540, and thus the relay lens 506 and eyewear cameras 114A-B.

Figure 10:
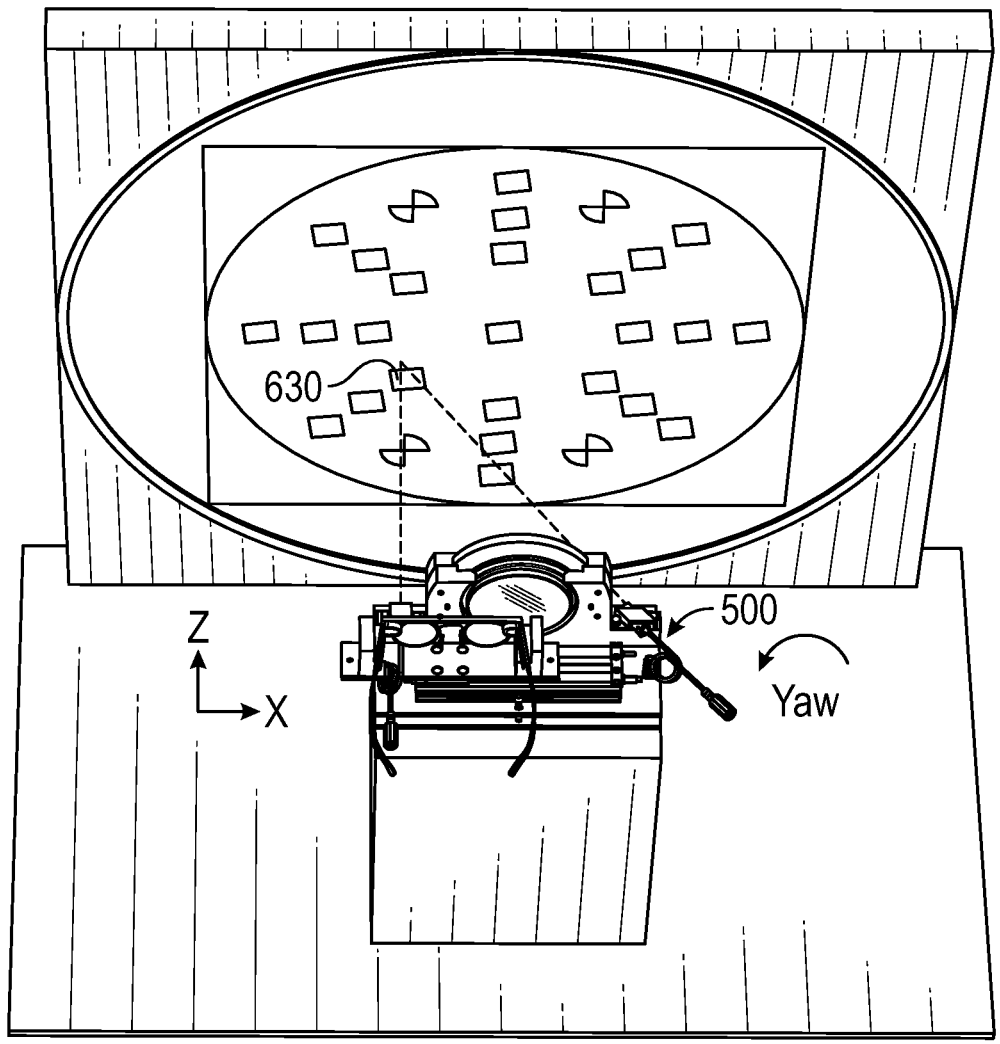
FIGS. 10, 11, and 12 illustrate the test fixture being aligned in multiple dimensions.

A triangulation laser 580 is shown in FIG. 5A that is located on top of the lens support 520 and is directed at a precision angle in front of the relay lens 506 for alignment of the CHEST 500 as will be discussed shortly. The triangulation laser 580 is aligned through a bore sight. An optical axis alignment laser 582 is shown positioned on the right side of lens support 520, on an opposite side of the relay lens 506 from triangulation laser 580. Both the triangulation laser 580 and the optical axis alignment laser 582 are configured so that their respective lasers will converge on a test screen when the CHEST 500 is at a proper distance z from the test screen (FIG. 10).

FIG. 5A and FIG. 5B show a left 590 and right 592 slider positioning screws that adjust the position of the left/right slider 504 z distance from the relay lens 506, and in yaw angle relative to the relay lens optical axis. The lens support 520 is threaded, or may have a threaded insert, receiving the left 590 and right 592 slider positioning screws. Both positioning screws 590 and 592 are adjusted equally to change the slider 504 z position, and one or both are adjusted differentially to impart a yaw, or rotation in the horizontal axis, on the slider 504 relative to the relay lens optical axis.

Figure 7:
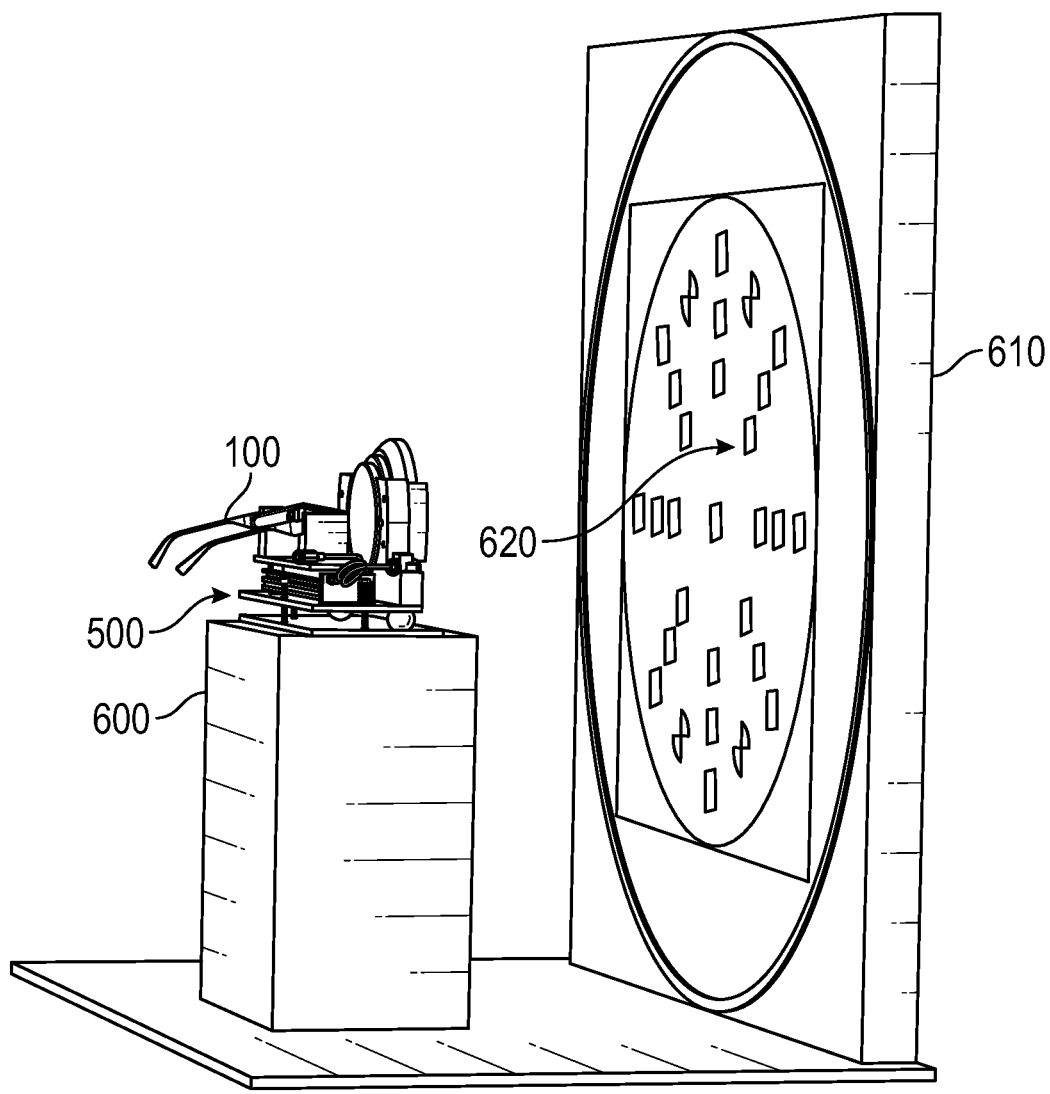
FIG. 7 illustrates the test fixture holding eyewear under test and positioned on top of a pedestal in front of a test screen displaying a test pattern including dots that may include slanted edges, and tilted squares.

Calibration—To calibrate and position the CHEST 500 for testing of the eyewear cameras 114A-B, the CHEST 500 holding eyewear 100 under test is manually positioned on top of a pedestal 600 and in front of a test screen 610 displaying a test pattern 620 including dots as shown in FIG. 7.

Figure 8A:
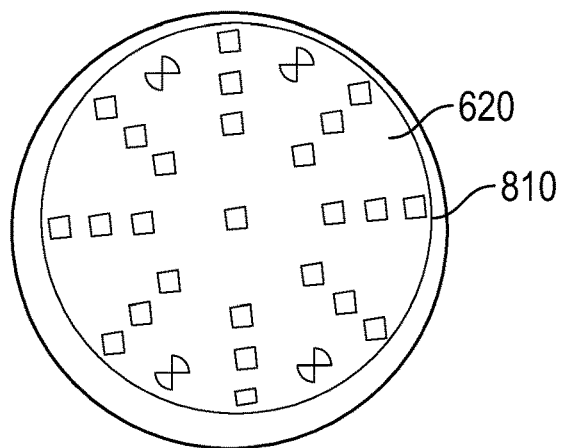
FIGS. 8A, 8B, and 8C show images captured by the cameras through the relay lens during testing of the eyewear.
Figure 8B:
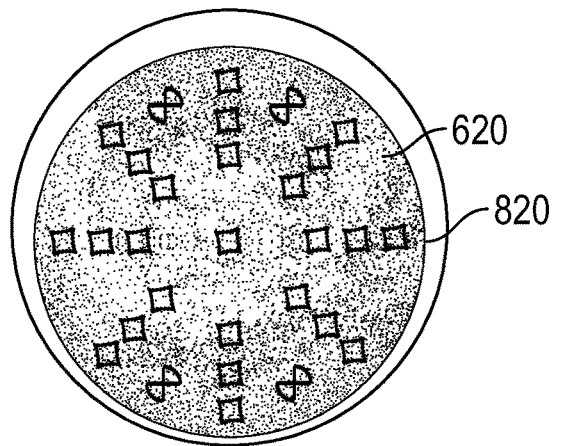
Figure 8C:
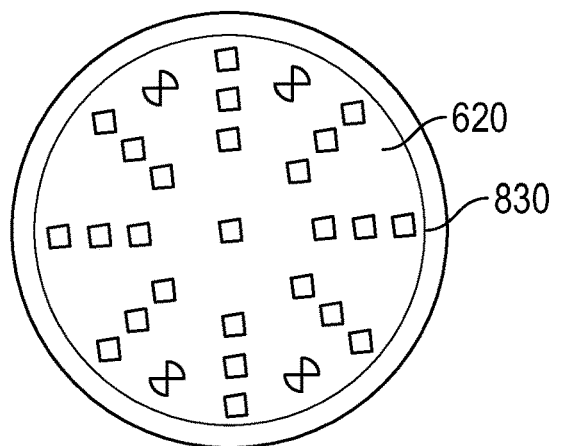

Referring to FIG. 8A-C, there are shown several images captured by cameras 114A and 114B through the relay lens 506 during testing of the eyewear 100. FIG. 8A illustrates an example poor quality image 810 where the camera has a downward misalignment causing the test chart to be displaced upward in the captured image. FIG. 8B illustrates an example poor quality image 820 where the camera is out of focus and has an upward misalignment causing the captured image to be blurry and displaced downward. FIG. 8C illustrates of an example good quality image 830 taken by a camera 114A-B that passes a test.

Figure 9:
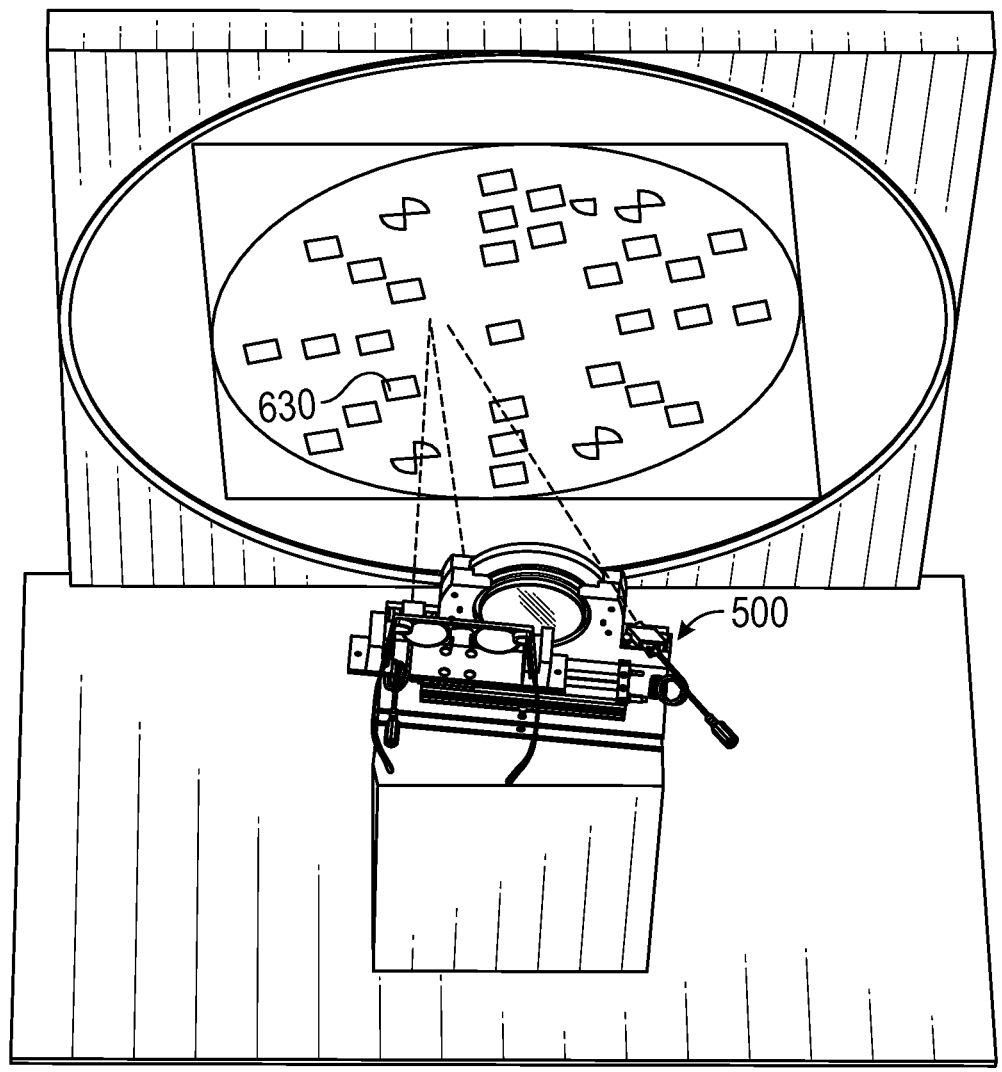
FIG. 9 shows the test fixture being misaligned.

To set-up the CHEST 500 in a test station, the CHEST 500 is shown in FIG. 9 as being misaligned because the emitted lasers of triangulation laser 580 and optical alignment laser 582 do not converge at the same location on test screen 610. In the example shown, the laser incidences on the test screen 610 are separated, meaning that the CHEST 500 is too close to test screen 610. In addition, the location of the laser incidence from optical alignment laser 582 is to the right of a visual feature of the test pattern 620, shown as dot 630, meaning that the CHEST is not properly aligned in x (left/right) to the test pattern. Also, the laser light from 582 reflected from the test screen 610 returns not along the horizontal axis of 582, but to the right, indicating that the CHEST 500 is angled to the right with respect to the test screen 610, as shown.

As shown in FIG. 10, the CHEST 500 is manually moved backwards on the surface of the pedestal 600, away from the test screen 610, such that the emitted lasers of triangulation laser 580 and optical alignment laser 582 converge on test screen 610 which indicates the CHEST 500 is properly set at the proper distance in the z direction. The pedestal 600 may also be moved rearwardly to achieve the proper z distance.

As also shown in FIG. 10, the CHEST 500 is manually moved in the x direction on the surface of pedestal 600 such that the incidence of the emitted laser of optical alignment laser 582 is at the visual feature shown as dot 630.

As also shown in FIG. 10, the CHEST 500 is manually rotated counterclockwise, to adjust the yaw by using the reflection of the emitted laser of optical alignment laser 582 such that it reflects back on itself in the horizontal axis, such that the reflection of the laser is centered left/right on the alignment laser 582.

Figure 11:
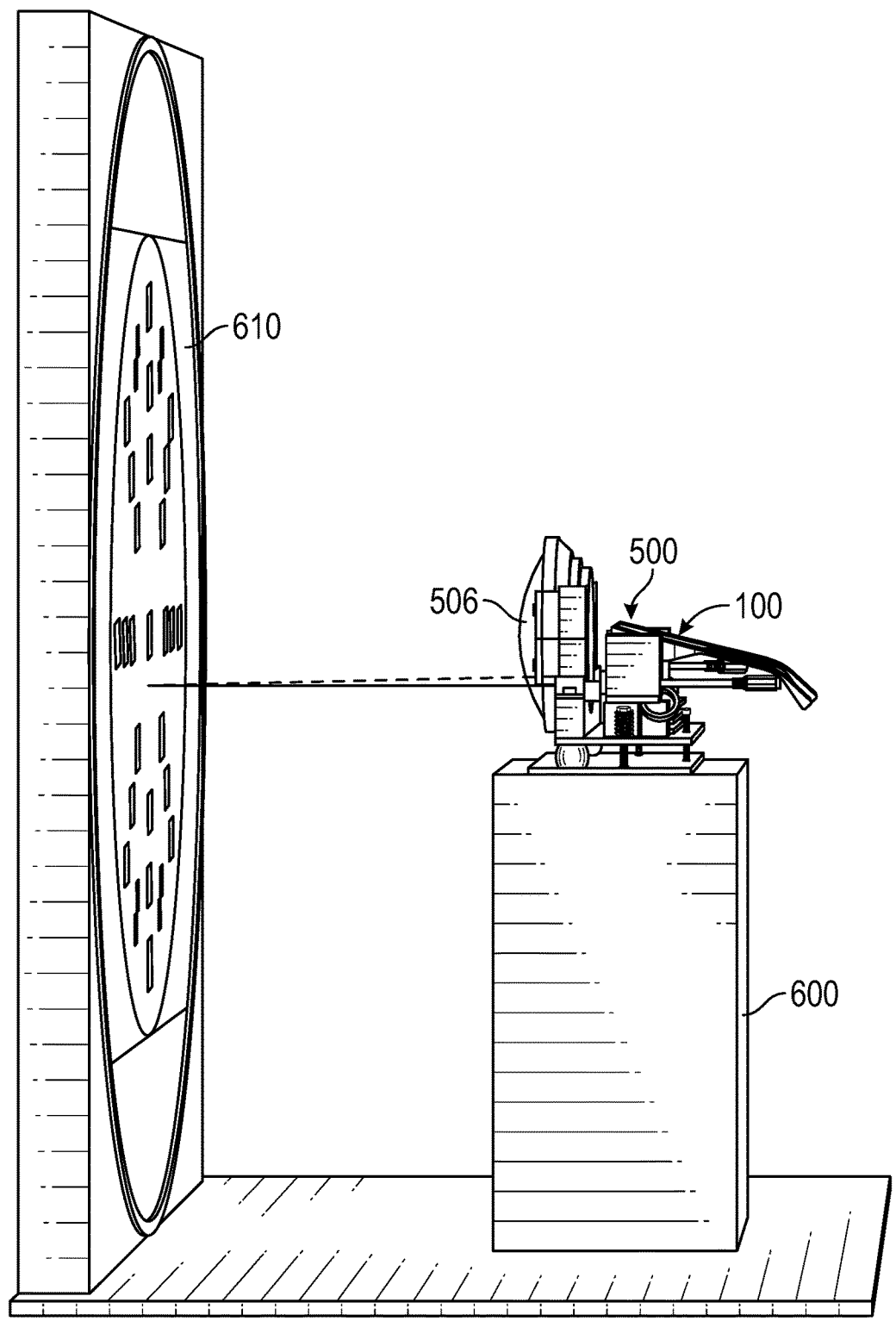

Referring to FIG. 11, the CHEST 500 is not aligned in pitch (elevation) because the laser reflection returns above the outgoing laser beam of laser 582. When the CHEST 500 is aligned in pitch (elevation) by adjusting the lead screw 570 such that the laser reflects back on itself in the vertical axis, the optical axis of the relay lens 506 will be perpendicular with the chart surface of test screen 610.

Figure 12:
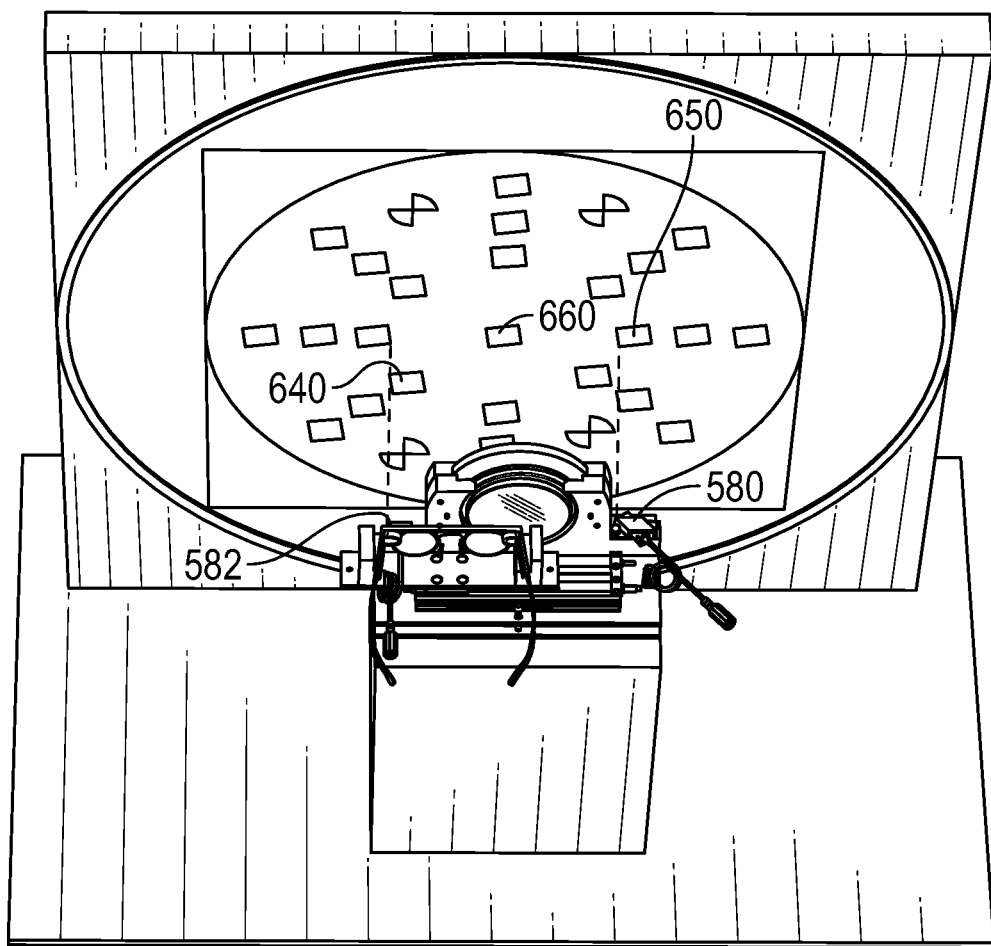

As shown in FIG. 12, the test chart 610 can be aligned in the y direction and rotation using an optional third laser 584 positioned adjacent arm 524 and the triangulation laser 580. The test screen 610 can be manually adjusted in they direction (up/down) so that the incidence of the lasers 582 and 584 are proximate to two symmetrical visual features shown as 640 and 650, which results in a central visual feature 660 aligning with the center of relay lens 506, and also the cameras 114A-B when selectively slid by left/right slider 504 in front of the central visual feature 660.

Testing of the image quality and alignment of each camera 114A and 114B is performed by using the pneumatically left/right slider 504 to precisely, and individually, slide the cameras 114A-B to be positioned behind the relay lens 506. The image taken by camera 114A, such as shown in FIG. 8A-8C, is considered to determine if the camera 114A produces an acceptable quality. Likewise, the camera 114B is positioned behind the relay lens 506 and the image taken by camera 114B is considered to determine if the camera 114B produces an acceptable quality. If both cameras 114A-B produce images of acceptable quality, the cameras of eyewear 110 pass. If either of the cameras 114A-B fail the test, the eyewear is sent to be corrected, such as by replacing a camera that fails, or the eyewear 100 is sent to scrap.

Figure 13:
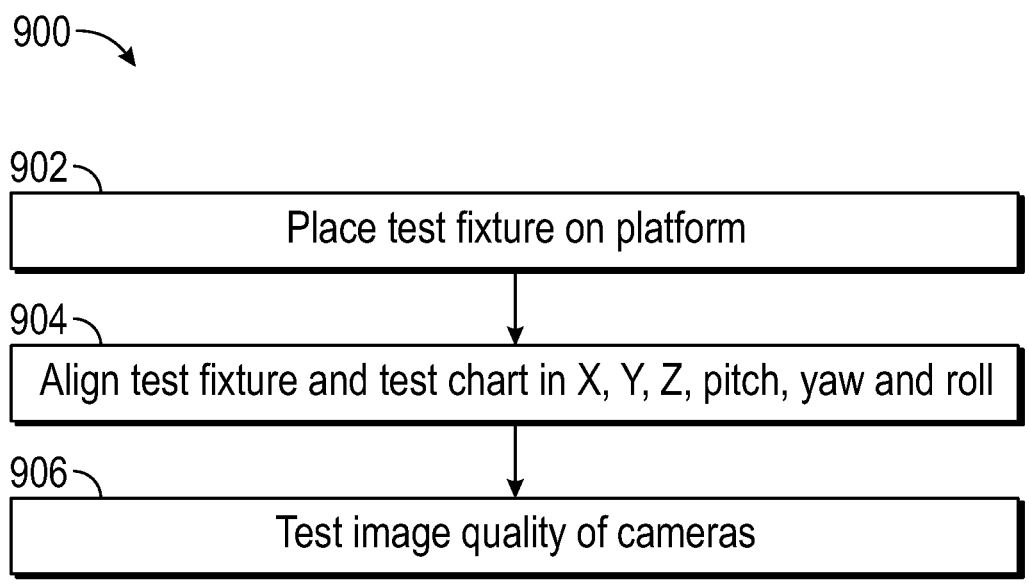
FIG. 13 is a flow diagram of a method of aligning the test fixture and testing the quality of the cameras.

FIG. 13 illustrates a method 900 of aligning the CHEST 500, and then testing the image quality of cameras 114A-B using the test fixture 500.

At block 902 the user places the CHEST 500 on a platform, such as pedestal 600 shown in FIG. 7 and FIG. 9, with the relay lens 506 facing the test screen 610.

At block 904, the CHEST 500 is manually adjusted and aligned as shown in FIG. 10 by rotating/moving the CHEST 500 on the pedestal 600 until the incidence of the laser beam generated by the triangulation laser 580 converges with the incidence of the laser beam generated by the optical axis alignment laser 582. When these laser beams converge on the test screen 610 the CHEST is properly aligned in the z dimension.

The CHEST 500 is moved in the x direction such that the laser beam emitted by the optical alignment laser 582 has an incidence at a visual feature on the test screen 610, such as dot 630.

Yaw is adjusted by using the reflection of the laser 582 that is parallel to the relay lens optical axis so that the laser beam from optical axis alignment laser 582 reflects back on itself in the horizontal axis. This is accomplished by rotating CHEST 500 clockwise or counterclockwise until the reflection of laser 582 is centered left/right over the output port at location 581 as shown in FIG. 5.

The pitch of the CHEST 500 is aligned by rotating the lead screw 570 (FIG. 6) until the laser beam from optical axis alignment laser 582 reflects back on itself in the vertical axis, as shown in FIG. 11.

The test chart 610 can be adjusted in the z (up/down) direction by moving the test chart 610 until the laser beams emitted by the optical axis alignment laser are each positioned by the respective dot 640 and 650 as shown in FIG. 12. This adjustment results in the central square 660 aligning with the center of the relay lens 506 and the positioned cameras 114A-B.

At block 906, the aligned CHEST 500 is used to test the image quality of the cameras 114A-B. The camera 114A is tested by using the pneumatic actuator 504 to selectively position the camera 114A behind the relay lens 506. The images shown in FIG. 8A-8C are examples of possible test results. FIG. 8A illustrates that the camera has downward misalignment with respect to eyewear 100 and fails the test. FIG. 8B illustrates an out of focus image and upward camera misalignment meaning that the camera is poor and fails the test. FIG. 8C illustrates that the camera has a good quality, and thus the camera passes the test.

Likewise, the second camera 114B is then selectively positioned behind the relay lens 506 using pneumatic actuator 504, and then tested for image quality as described. If either camera 114A-B fails, the eyewear 100 fails and this thus sent for rework or scrapped.

The successful alignment of the cameras 114A,114B, the relay lens 506 and the test chart 610 depend on accurately aligning the axis of travel of the left/right slider 504 perpendicular to the optical axis of the relay lens 506. If this is not possible due to significantly large enough variations in the dimensions of the left/right slider 504 or other manufacturing variations in the plate 540 or 550, then two slider positioning screws, 590 and 592, may be used. FIG. 5A and FIG. 5B shows a left 590 and right 592 slider positioning screws that adjust the position of the left/right slider 504 z distance from the relay lens 506, and in yaw angle relative to the relay lens optical axis. Both positioning screws 590 and 592 are adjusted equally to change the slider 504 z position, and one or both are adjusted differentially to impart a yaw, or rotation in the horizontal axis, on the slider 504 relative to the relay lens optical axis.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A test fixture, comprising:
   a device holder configured to securely hold an eyewear having a first camera and a second camera;
   a relay lens;
   an actuator configured to selectively center the eyewear first camera behind the relay lens, and configured to separately and selectively center the eyewear second camera behind the relay lens; and
   an aligner configured to align the test fixture in at least four dimensions with respect to a test screen.

2. The test fixture as specified in claim 1, wherein the eyewear cameras are each optically aligned with the relay lens when centered behind the relay lens.

3. The test fixture as specified in claim 1, wherein the eyewear has a first temple and a second temple, wherein the device holder has a first support configured to secure the first temple of the eyewear and a second support configured to secure the second temple of the eyewear such that the first and second cameras are secured when positioned behind the relay lens.

4. The test fixture as specified in claim 1, further comprising an adjuster configured to adjust the relay lens with respect to the device holder.

5. The test fixture as specified in claim 1, wherein the aligner comprises at least one laser.

6. The test fixture as specified in claim 5, further comprising a first laser configured to direct a first laser beam in a direction normal to the test fixture, and a second laser separated from the first laser and configured to direct a second laser beam at an angle and toward the first laser beam.

7. The test fixture as specified in claim 1, wherein the aligner is configured to align the test fixture in an x, y, z, and pitch direction.

8. The test fixture as specified in claim 1, further comprising a test screen positioned at a convergence of the first laser beam and the second laser beam.

9. The test fixture as specified in claim 1, further comprising a base supporting the device holder, the base having a first member positioned over and separated from a second member, and a pivot coupling the first and second members.

10. The test fixture as specified in claim 9, wherein pivot comprises a round or elliptical member, and the second member comprises an elliptical recess receiving the round or elliptical member.

11. A method comprising:
    using a device holder configured to securely hold an eyewear having a first camera and a second camera, a relay lens, an aligner configured to align the test fixture in at least four dimensions with respect to a test screen, and an actuator configured to selectively position the first camera and the second camera;
    centering the eyewear first camera behind the relay lens and determining an image quality of the first camera; and
    centering the eyewear second camera behind the relay lens and determining an image quality of the second camera.

12. The method as specified in claim 11, using the actuator to individually position the first camera and the second camera behind the relay lens so that they are each optically aligned with the relay lens when centered behind the relay lens.

13. The method as specified in claim 11, wherein the eyewear has a first temple and a second temple, wherein the device holder has a first support configured to secure the first temple of the eyewear and a second support configured to secure the second temple of the eyewear such that the first and second cameras are secured when positioned behind the relay lens.

14. The method as specified in claim 11, further comprising adjusting the relay lens with respect to the device holder.

15. The method as specified in claim 11, wherein the aligner comprises at least one laser.

16. The method as specified in claim 15, wherein the test fixture comprises a first laser directing a first laser beam in a direction normal to the test fixture, and a second laser separated from the first laser and directing a second laser beam at an angle and toward the first laser beam.

17. The method as specified in claim 16, further comprising positioning the test screen at a convergence of the first laser beam and the second laser beam.

18. The method as specified in claim 11, further comprising aligning the test fixture in an x, y, z, and pitch direction.

19. The method as specified in claim 11, wherein test fixture includes a base supporting the device holder and comprising a first member positioned over and separated from a second member, comprising positioning the first member with respect to the second member.

20. The method as specified in claim 19, further comprising pivoting the first member with respect to the second member.

* * * * *